United States Patent
Jootar et al.

(10) Patent No.: US 7,155,177 B2
(45) Date of Patent: Dec. 26, 2006

(54) WEIGHT PREDICTION FOR CLOSED-LOOP MODE TRANSMIT DIVERSITY

(75) Inventors: Jittra Jootar, San Diego, CA (US);
Da-shan Shiu, San Jose, CA (US);
Parvathanathan Subrahmanya,
Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 341 days.

(21) Appl. No.: 10/364,638

(22) Filed: Feb. 10, 2003

(65) Prior Publication Data
US 2004/0157567 A1    Aug. 12, 2004

(51) Int. Cl.
H04B 1/02      (2006.01)
H04B 17/00     (2006.01)
H04B 1/10      (2006.01)

(52) U.S. Cl. ............... 455/101; 455/67.11; 455/115.1; 455/296

(58) Field of Classification Search ............... 455/101, 455/95, 114.2, 115.2, 115.3, 127.2, 130, 135, 455/138, 269, 277.2, 278.1, 296, 334, 339
See application file for complete search history.

(56) References Cited

U.S. PATENT DOCUMENTS

| | | | |
|---|---|---|---|
| 5,799,047 A * | 8/1998 | Dobrica ............... | 375/350 |
| 6,078,611 A * | 6/2000 | La Rosa et al. ............. | 375/147 |
| 6,115,406 A * | 9/2000 | Mesecher ............... | 375/130 |
| 6,377,812 B1 * | 4/2002 | Rashid-Farrokhi et al. . | 455/522 |
| 6,411,257 B1 * | 6/2002 | Sorelius et al. ............. | 342/378 |
| 6,492,942 B1 * | 12/2002 | Kezys ............... | 342/368 |
| 6,603,801 B1 * | 8/2003 | Andren et al. ............. | 375/147 |
| 6,765,969 B1 * | 7/2004 | Vook et al. ............... | 375/259 |
| 2004/0198452 A1 * | 10/2004 | Roy ............... | 455/562.1 |

* cited by examiner

Primary Examiner—Tony T. Nguyen
(74) Attorney, Agent, or Firm—Philip R. Wadsworth; Charles D. Brown; George C. Pappas

(57) ABSTRACT

Techniques for predicting weights used for closed-loop transmit diversity. In a channel prediction scheme, channel gains for multiple transmit antennas are initially estimated (e.g., based on pilots received from these antennas) and used to derive predicted channel gains for a future time instant. The predicted channel gains are then used to derive predicted weights that are deemed to be "optimal" at the future time instant. Optimality may be determined based on one or more criteria, such as maximizing a received SNR for the received signals. In a weight prediction scheme, the channel gains for the multiple antennas are estimated and used to compute optimal weights for the current time instant. The current optimal weights are then used to predict the optimal weights at the future time instant. For both schemes, the prediction may be performed based on an adaptive filter (e.g., LMS or RLS filter) or a non-adaptive filter.

30 Claims, 5 Drawing Sheets

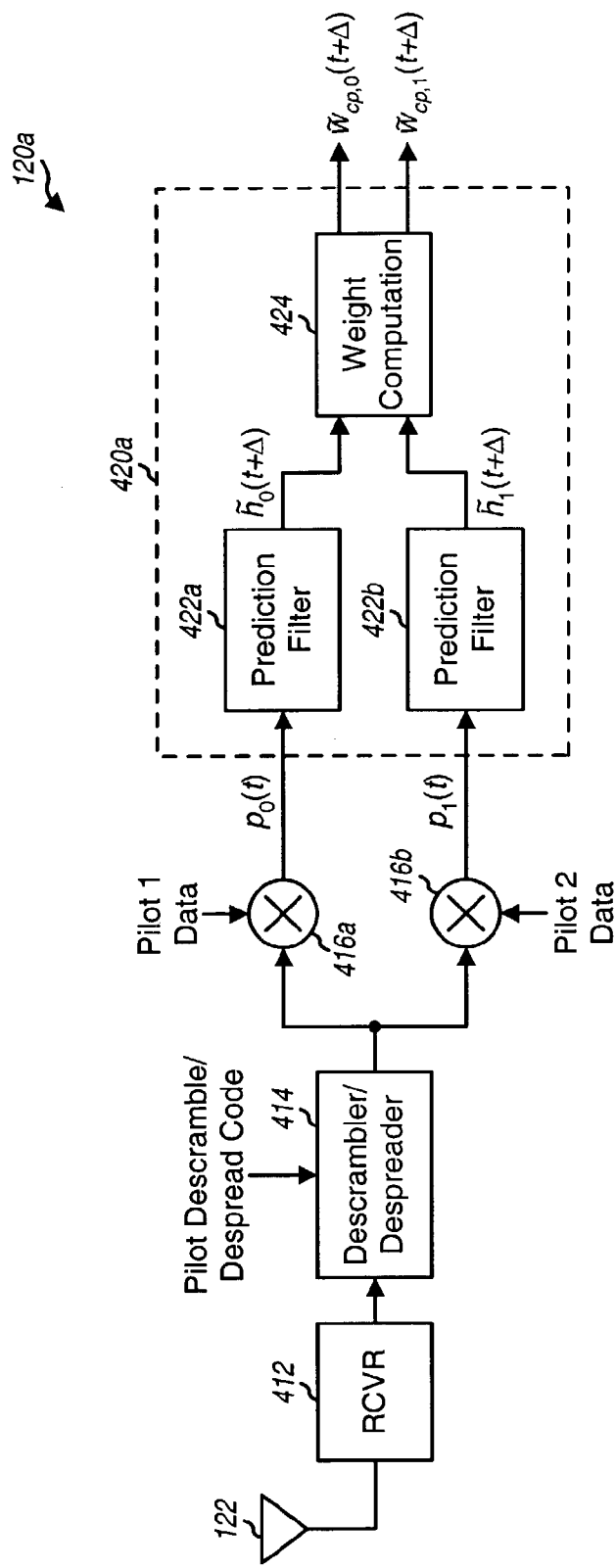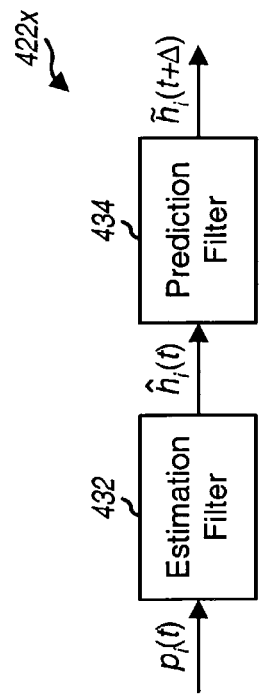
FIG. 4A
FIG. 4B

WEIGHT PREDICTION FOR CLOSED-LOOP MODE TRANSMIT DIVERSITY

BACKGROUND

I. Field

The present invention relates generally to data communication, and more specifically to techniques for predicting weights used for closed-loop transmit diversity in wireless communication systems.

II. Background

In a wireless communication system, data to be transmitted is first modulated onto a radio frequency (RF) carrier signal to generate an RF modulated signal that is more suitable for transmission over a wireless channel. The transmitted RF modulated signal may reach a receiver via a number of propagation paths. The characteristics of the propagation paths may vary over time due to various factors such as, for example, fading and multipath. Consequently the transmitted RF modulated signal may experience different channel conditions and may be associated with different complex channel gains over time.

To provide diversity against deleterious path effects and improve reliability, multiple transmit antennas and/or multiple receive antennas may be used for data transmission. Transmit diversity is achieved by the use of multiple antennas to transmit data, and receive diversity is achieved by the use of multiple antennas to receive a data transmission. A transmission channel is formed between each of the transmit antenna(s) and each of the receive antenna(s). If the transmission channels for different transmit/receive antenna pairs are linearly independent (i.e., a transmission on one channel is not formed as a linear combination of the transmissions on the other channels), which is generally true to at least an extent, then diversity increases and the likelihood of correctly receiving a data transmission improves as the number of antennas increases.

For costs and other considerations, some wireless communication systems employ multiple antennas at a base station and a single antenna at a terminal for data transmission. On the downlink, transmit diversity may be achieved by transmitting data redundantly on multiple RF modulated signals from the multiple base station antennas redundantly on multiple RF modulated signals from the multiple base station antennas to the single terminal antenna. These signals typically experience different channel conditions and may be associated with different channel gains. Consequently, these signals typically arrive at the terminal antenna with different phases and amplitudes, and may add constructively or destructively.

A control loop may be maintained to determine weights to be applied to the multiple RF modulated signals, at the base station, such that these signals maximally combine at the terminal. The control loop would estimate the complex channel gain (which is also referred to as fading coefficient) between each of the multiple antennas at the base station and the single antenna at the terminal. The control loop would then determine the "optimal" weights for the RF modulated signals based on the estimated channel gains for the multiple base station antennas. The weights are then applied to the RF modulated signals prior to transmission from the base station antennas. By adjusting the phase and possibly the amplitude of the transmitted RF modulated signals, the received signals at the terminal can be assured to add constructively, and improved performance may then be achieved.

The performance of a closed-loop transmit diversity scheme, such as the one described above, is dependent on the optimality of the weights at the time that they are applied. Unfortunately, any closed-loop transmit diversity scheme will exhibit some amounts of delay between the time that the weights are computed to the time that they are applied. If the channel condition is not static or stationary during this entire delay (e.g., due to movement by the terminal), then the weights that may have been optimal at the time that they are computed may be far from optimal at the time that they are applied. This would then degrade performance.

There is therefore a need in the art for techniques for predicting weights used for closed-loop transmit diversity in wireless communication systems.

SUMMARY

Techniques are provided herein for predicting weights that are "optimal" at the time that they are applied to the RF modulated signals, instead of being optimal at the time that they are computed. These techniques may provide improved performance for non-stationary wireless channels (e.g., due to Doppler shifts caused by movement of the terminal).

The weights may be predicted using various schemes. In a channel prediction scheme, the channel gains for multiple transmit antennas are initially estimated (e.g., based on pilots received from these antennas) and used to derive predicted channel gains for a future time instant. The predicted channel gains are then used to derive predicted weights that are deemed to be optimal at the future time instant. Optimality may be determined based on one or more criteria, such as maximizing a received signal-to-noise ratio (SNR) for the received signals. In a weight prediction scheme, the channel gains for the multiple antennas are estimated and used to compute the optimal weights for the current time instant. The current optimal weights are then used to predict the optimal weights at the future time instant. For both schemes, the prediction may be performed based on an adaptive filter or a non-adaptive filter. These schemes are described in further detail below.

Various aspects and embodiments of the invention are also described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 4A and 4B show block diagrams of the processing at the terminal for the channel prediction scheme;

DETAILED DESCRIPTION

The techniques described herein for predicting weights may be used for various closed-loop transmit diversity schemes and for various wireless communication systems. In general, these techniques may be used for any closed-loop transmit diversity scheme that has some inherent delay between the computation of the weights and their application. For clarity, these techniques are described specifically for the downlink in a W-CDMA communication system (i.e., a CDMA system that implements W-CDMA standard, which is known in the art).

Figure 1:
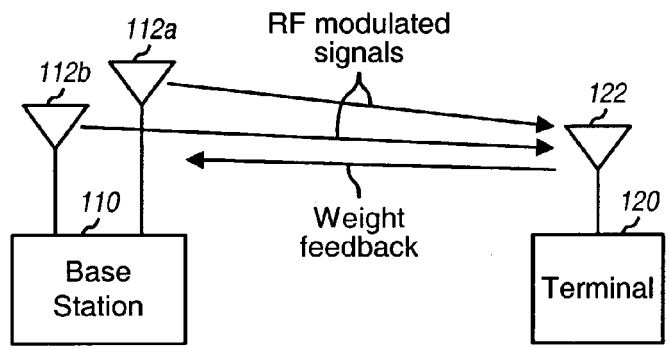
FIG. 1 shows a downlink data transmission from a base station to a terminal in a wireless (e.g., W-CDMA) communication system.

FIG. 1 shows a downlink data transmission from a base station 110 to a terminal 120 in a W-CDMA system. A base station is generally a fixed station that is used for communicating with the terminals, and may also be referred to as a Node B (in W-CDMA), an access point, or some other terminology. A terminal is a fixed or mobile station that can communicate with the base station, and may also be referred to as a user equipment (UE) (in W-CDMA), a mobile station, a remote station, an access terminal, a wireless communication device, or some other terminology.

W-CDMA supports a "closed loop mode transmit diversity" scheme that uses two antennas at the base station for data transmission on the downlink. One antenna is referred to as the reference antenna, and the other antenna is referred to as the diversity antenna.

The closed loop mode transmit diversity scheme in W-CDMA has two modes of operation—mode 1 and mode 2. In mode 1, the phase of the RF modulated signal transmitted from the diversity antenna is adjusted at the base station so that the RF modulated signals from both the reference and diversity antennas are inphase and maximally combined at the terminal. In mode 2, both the phase and the amplitude of the RF modulated signal transmitted from the diversity antenna are adjusted so that the two RF modulated signals are inphase and maximally combined at the terminal.

To achieve the maximal combining at the terminal antenna, the terminal determines the optimal weights for the two RF modulated signals. Each weight is typically a complex value. For W-CDMA, the two weights are normalized so that only one normalized weight needs to be sent back to the base station. The weight sent by the terminal indicates only phase adjustment in mode 1, and both phase and amplitude adjustments in mode 2.

Figure 2:
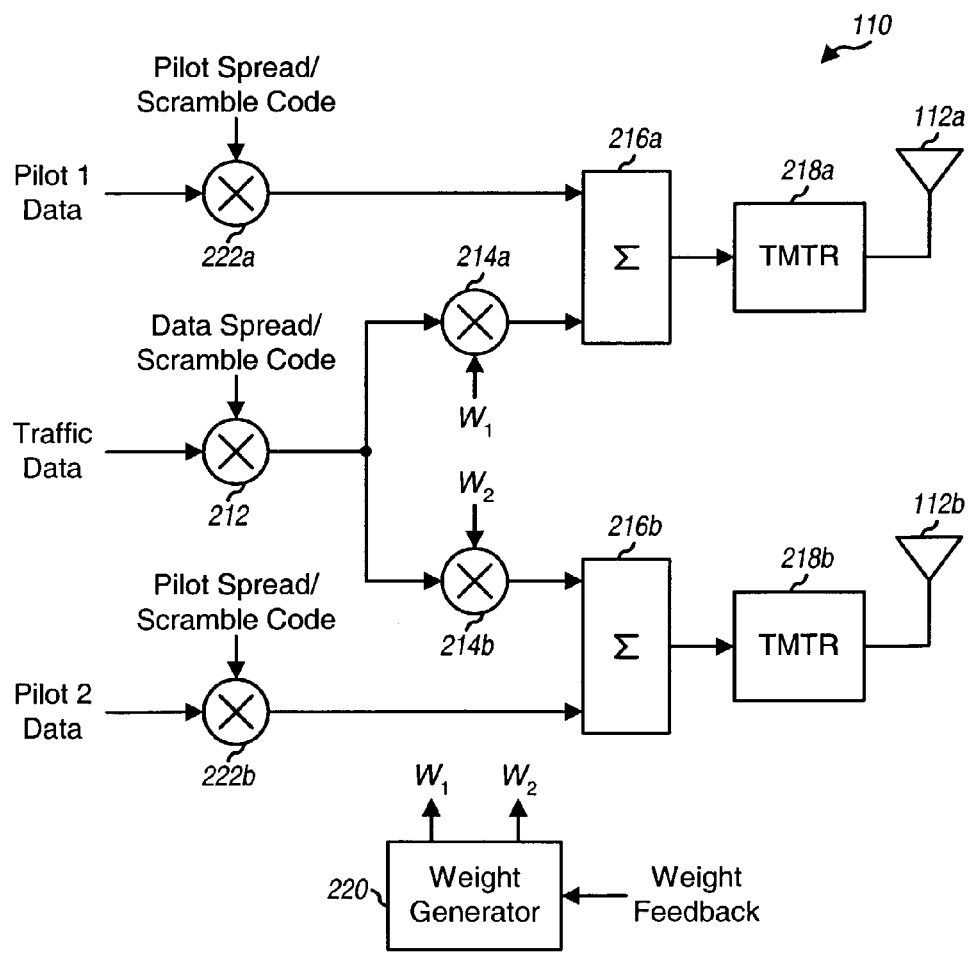
FIG. 2 shows a block diagram of the processing at the base station to support closed loop mode transmit diversity defined by W-CDMA.

FIG. 2 shows a block diagram of the processing at base station for the closed loop mode transmit diversity defined by W-CDMA. The traffic data to be transmitted by the base station is provided to a complex multiplier 212, which spreads and scrambles the traffic data with a data spread/scramble code that is formed by a combination of a particular orthogonal variable spreading factor (OVSF) code and a particular scrambling code. The spreading channelizes the traffic data onto a particular physical channel that is associated with the particular OVSF code. The scrambling spectrally spreads the channelized data over the entire operating bandwidth of the system. The complex-valued data from multiplier 212 is then provided to two multipliers 214a and 214b, which respectively receive two complex-valued weight factors $W_1$ and $W_2$ for the two transmit antennas. The weight factors $W_1$ and $W_2$ are determined based on the weight feedback received from the terminal. Each multiplier 214 performs complex multiplication of its received data with the associated weight factor to provide complex-valued weighted data.

For W-CDMA, a pilot is sent on a common pilot channel (CPICH) for all terminals in the system. This common pilot is generated based on a first data pattern (i.e., pilot 1 data) for the reference antenna and a second data pattern (i.e., pilot 2 data) for the diversity antenna, where the two data patterns are orthogonal to one another. Thus, pilot 1 data and pilot 2 data are provided to multipliers 222a and 222b, respectively. Each multiplier 222 spreads and scrambles its received pilot data with a pilot spread/scramble code to form pilot symbols for the associated antenna. The pilot symbols for each antenna may be used by the terminals to estimate the channel gain for that antenna.

The weighted data from multiplier 214a is then combined (or multiplexed) with the pilot symbols from multiplier 222a, and the weighted data from multiplier 214b is combined with the pilot symbols from multiplier 222b. The complex-valued data streams from combiners 216a and 216b are then provided to, and processed by, transmitter units (TMTRs) 218a and 218b, respectively, to provide two RF modulated signals that are then transmitted from antennas 112a and 112b, respectively.

Figure 3:
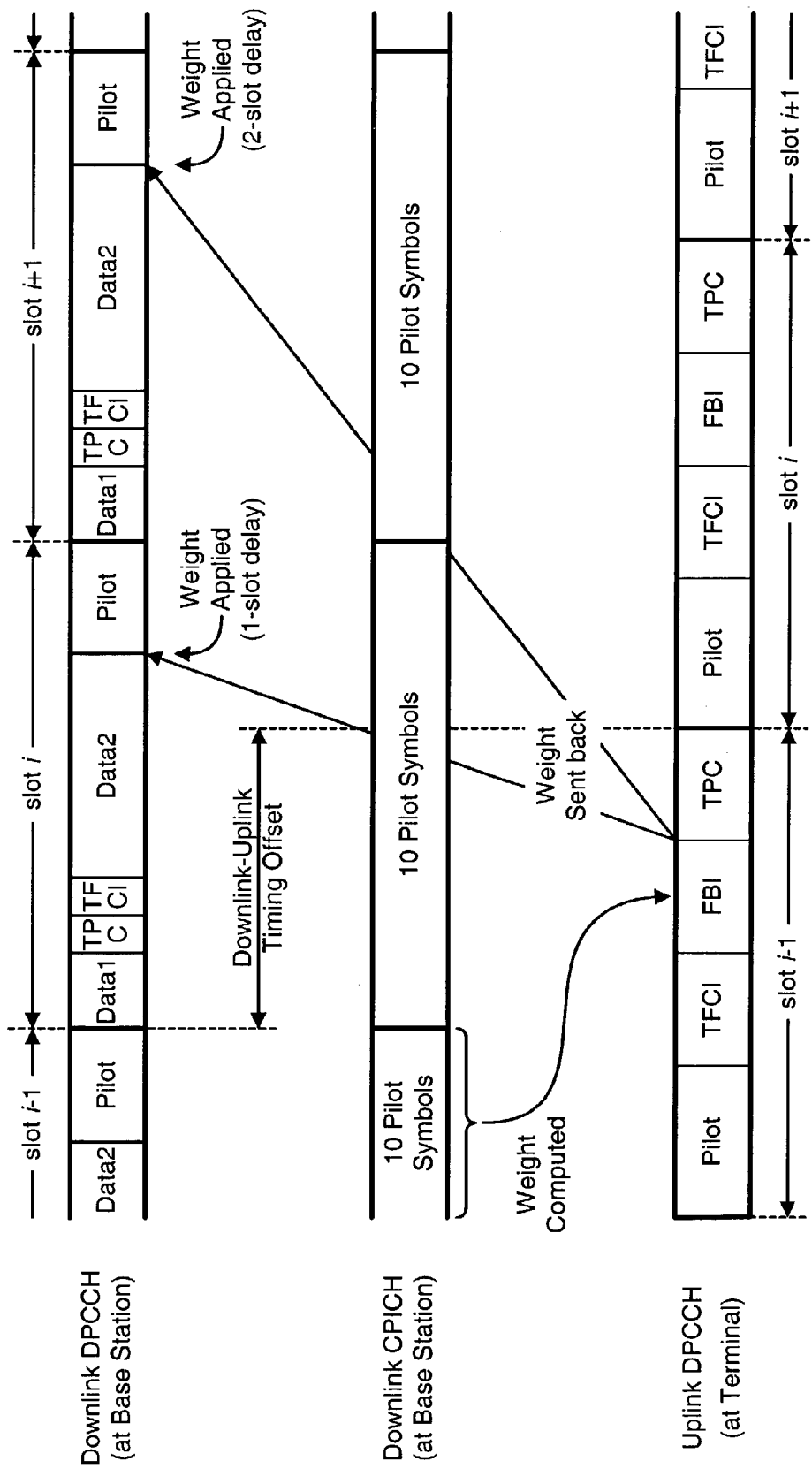
FIG. 3 shows a timing diagram for the closed loop mode transmit diversity in W-CDMA.

FIG. 3 shows a timing diagram for the closed loop mode transmit diversity in W-CDMA. The CPICH is transmitted by the base station and includes orthogonal pilots for the two antennas. In particular, the pilot for the reference antenna is a sequence of 10 pilot symbols defined as {A, A, A, A, A, A, A, A, A, A}, and the pilot for the diversity antenna is an orthogonal sequence of 10 pilot symbols defined as {A, −A, −A, A, A, −A, −A, A, A, −A }, where A=1+j. The two pilot symbol sequences may be viewed as being generated by two data patterns. The two pilot symbol sequences are transmitted from the reference and diversity antenna in each slot, which has a duration of ⅔ msec in W-CDMA.

The terminal receives the CPICH, processes the pilot symbols, and determines the weights to use for transmit diversity. The weights are processed, compressed, quantized, and sent back to the base station in a feedback information (FBI) field of an uplink dedicated physical control channel (DPCCH). The base station receives the weight feedback, computes the weight factors $W_1$ and $W_2$ for the two antennas based on the weight feedback, and applies the weight factors at the start of a pilot field in the downlink DPCCH in either the next slot (if a 1-slot delay is specified) or the following slot (if a 2-slot delay is specified). The system determines whether 1-slot or 2-slot delay is to be used, and the terminal has knowledge of this delay.

The closed loop mode transmit diversity in W-CDMA is described in detail in 3GPP TS 25.214, entitled "Physical Layer Procedures (FDD)," which is publicly available and incorporated herein by reference.

In any closed-loop transmit diversity scheme, such as the one supported by W-CDMA and shown in FIGS. 2 and 3, there will inherently be some delay from the time that the weights are computed (e.g., by the receiver) to the time that the weights are applied by the transmitter. For W-CDMA, the delay is approximately one or two slots (which is selectable by the system). This delay includes (1) processing delay at the terminal to determine the weight feedback, (2) propagation delay to send the weight feedback, and (3) processing delay at the base station to process and apply the weight feedback.

The delay in the closed-loop transmit diversity scheme may cause significant degradation in performance under certain situations. For example, moderate to higher Doppler shifts caused by movement of the terminal can result in significant changes in the propagation paths between the two transmit antennas and the receive antenna. In this case, although the weights may have been optimal when computed for a particular channel condition, they may be far from optimal at the time that they are applied because the channel may have changed considerably.

The techniques described herein can provide improved performance, especially for a non-stationary wireless channel, by predicting weights that are optimal at the time that they are applied to the RF modulated signals, instead of being optimal at the time that they are computed. As described in further detail below, the weights are computed based on estimates of the channel gains (or fading coefficients) between the two transmit antennas at the base station and the single receive antenna at the terminal.

The optimal weights may be predicted using various schemes. In a channel prediction scheme, the channel gains for the two transmit antennas are initially estimated and used to derive predicted channel gains for a future time instant. The predicted channel gains are then used to derive the predicted weights that are deemed to be optimal at the future time instant. In a weight prediction scheme, the channel gains for the multiple antennas are estimated and used to compute the optimal weights for the current time instant. The current optimal weights are then used to predict the optimal weights at the future time instant. Both of these schemes are described in further detail below.

FIG. 4A shows a block diagram of the processing at a terminal $120a$ for the channel prediction scheme. Terminal $120a$ is one embodiment of terminal 120 in FIG. 1. The two downlink RF modulated signals transmitted by the base station are received by antenna 122, and the signal from antenna 122 is processed by a receiver unit (RCVR) 412 to provide a stream of samples. The samples are then provided to a descrambler/despreader 414 and descrambled and despread with a pilot descramble/despread code that is complementary to the pilot spread/scramble code used at the base station.

The despread pilot symbols from unit 414 are then provided to multipliers $416a$ and $416b$. Multiplier $416a$ receives and multiplies the conjugate of the pilot symbols for the reference antenna (i.e., conjugated pilot 1 data) with the despread pilot symbols from unit 414 to provide "de-patterned" pilot symbols $p_0(t)$ for the reference antenna. Similarly, multiplier $416b$ receives and multiplies the conjugate of the pilot symbols for the diversity antenna (i.e., conjugated pilot 2 data) with the despread pilot symbols from unit 414 to provide de-patterned pilot symbols $p_1(t)$ for the diversity antenna. The de-patterned pilot symbols $p_0(t)$ and $p_1(t)$ may be expressed as:

$$p_0(t) = s_0(t) \cdot h_0(t) + n_0(t), \text{ and} \qquad \text{Eq(1)}$$

$$p_1(t) = s_1(t) \cdot h_1(t) + n_1(t),$$

where $s_0(t)$ and $s_1(t)$ are the pilot symbols transmitted from the reference and diversity antennas, respectively;

$h_0(t)$ and $h_1(t)$ are the channel gains or fading coefficients that are indicative of the complex gains for the transmission channels between the reference and diversity antennas, respectively, and the terminal antenna; and $n_0(t)$ and $n_1(t)$ are the noise associated with the transmission channels for the reference and diversity antennas, respectively.

A processing unit $420a$ then receives and operates on the de-patterned pilot symbols $p_0(t)$ and $p_1(t)$, in accordance with the channel prediction scheme, to provide predicted weights $\tilde{w}_{cp,0}(t+\Delta)$ and $\tilde{w}_{cp,1}(t+\Delta)$ for the reference and diversity antennas, respectively. The weights $\tilde{w}_{cp,0}(t+\Delta)$ and $\tilde{w}_{cp,1}(t+\Delta)$ are predicted to be optimal at a future time instant $t+\Delta$, which is $\Delta$ seconds from the current time instant t. The delay $\Delta$ is the known delay between the current time instant (which is the time associated with the more recent de-patterned pilot symbols $p_0(t)$ and $p_1(t)$ that are used to derive the predicted weights) and the future time instant when the predicted weights are applied at the base station. The current time instant may not be the time the weights are computed, since there may be a delay from the most recent pilot symbols to the time the weight computation is performed. However, for simplicity, the description throughout assumes that the weight computation occurs at (or coincide with) the most recent de-patterned pilot symbols (i.e., the weight computation is performed at time t). For W-CDMA, $\Delta$ is between one and two slots for the closed loop mode transmit diversity.

In the embodiment shown in FIG. 4A, for the channel prediction scheme, processing unit $420a$ includes prediction filters $422a$ and $422b$ and a weight computation unit 424. Prediction filter $422a$ receives and processes the de-patterned pilot symbols $p_0(t)$ to provide a predicted channel gain $\tilde{h}_0(t+\Delta)$ for the reference antenna. Similarly, prediction filter $422b$ receives and processes the de-patterned pilot symbols $p_1(t)$ to provide a predicted channel gain $\tilde{h}_1(t+\Delta)$ for the diversity antenna. The predicted channel gains $\tilde{h}_0(t+\Delta)$ and $\tilde{h}_1(t+\Delta)$ are the gains predicted for transmission channels associated with the reference and diversity antennas at the future time instant $t+\Delta$ (instead of the current time instant t). Weight computation unit 424 then computes the predicted weights $\tilde{w}_{cp,0}(t+\Delta)$ and $\tilde{w}_{cp,1}(t+\Delta)$ based on the predicted channel gains $\tilde{h}_0(t+\Delta)$ and $\tilde{h}_1(t+\Delta)$.

Prediction filters $422a$ and $422b$ may be implemented with any filter that can predict future channel gains based on current noisy pilot symbols. Each prediction filter 422 may be implemented with an adaptive filter or a non-adaptive filter. Examples of adaptive filters include least mean square (LMS) filter, recursive least square (RLS) filter, Kalman filter, and so on. Adaptive and non-adaptive filters may be implemented using an infinite impulse response (IIR) filter, a finite impulse response (FIR) filter, or some other filter structure. Adaptive filters can track changes in the wireless channel based on statistics derived from the filter inputs. Non-adaptive filters normally need to be provided with additional information that characterizes, models, and/or predicts the channel.

FIG. 4B shows a block diagram of an embodiment of a prediction filter $422x$, which may be used for each of prediction filters $422a$ and $422b$ in FIG. 4A. Prediction filter $422x$ includes an estimation filter 432 coupled to a prediction filter 434.

Estimation filter 432 receives and processes de-patterned pilot symbols $p_i(t)$ for a particular antenna i, where $i \in \{0, 1\}$, to provide an estimate of the channel gain $\hat{h}_i(t)$ for the transmission channel associated with that antenna. Estimation filter 432 may be implemented as an IIR filter, a FIR filter, or some other filter. The characteristics of the estimation filter may be selected to pass the desired signal with as little distortion as possible and to suppress as much noise as possible. Estimation filter 432 may also be implemented with any other type of filter that can estimate the channel gain based on the noisy de-patterned pilot symbols.

Prediction filter 434 receives and processes the estimated channel gain $\hat{h}_i(t)$ for the current time instant t to provide the predicted channel gain $\tilde{h}_i(t+\Delta)$ for the future time instant $t+\Delta$. Prediction filter 434 may be implemented as an adaptive filter or a non-adaptive filter and with an IIR, FIR, or some other filter structure. For an adaptive filter, the LMS, RLS, or some other adaptive algorithm may be used to adapt the filter. In a specific embodiment, prediction filter 434 is implemented as an RLS filter. The predicted channel gain $\tilde{h}_i(t+\Delta)$ may then be computed as follows:

$$\underline{k}_i(t)=\lambda^{-1}\underline{P}_i(t-1)\underline{\hat{h}}_i(t), \qquad \text{Eq(2b)}$$

$$\alpha_i(t)=1-\underline{k}_i^H(t)\underline{\hat{h}}_i(t), \qquad \text{Eq(2b)}$$

$$\underline{g}_i(t) = \frac{\underline{k}_i(t)}{\alpha_i(t)}, \qquad \text{Eq (2c)}$$

$$\underline{P}_i(t)=\lambda^{-1}\underline{P}_i(t-1)-\underline{g}_i(t)\underline{k}_i^H(t), \qquad \text{Eq(2d)}$$

$$e_i(t)=\hat{h}_i(t)-\underline{c}_i^H(t-1)\underline{\hat{h}}_i(t), \qquad \text{Eq(2e)}$$

$$\underline{c}_i(t)=\underline{c}_i(t-1)+\underline{g}_i(t)\,e_i^*(t), \qquad \text{Eq(2f)}$$

$$\tilde{h}_i(t+\Delta)=\underline{c}_i^H(t)\underline{\hat{h}}_i(t+\Delta), \qquad \text{Eq(2g)}$$

where $\underline{\hat{h}}_i(t)$ is an N×1 vector of prior estimated channel gains (i.e., $\underline{\hat{h}}_i(t)=[\hat{h}_i(t-\Delta)\ \hat{h}_i(t-\Delta-1)\ \ldots\ \hat{h}_i(t-\Delta-N+1)]^T$);

$\underline{P}_i(t)$ is an N×N inverse correlation matrix that is initialized as $\underline{P}_i(\Delta+N-1)=\delta^{-1}\underline{I}$, where δ is a small positive value and $\underline{I}$ is the identity matrix;

$\underline{k}_i(t)$ is an N×1 vector for the adaptation gain for a priori RLS filter;

$\underline{g}_i(t)$ is an N×1 vector for the adaptation gain for a posteriori RLS filter;

$e_i(t)$ is a priori error;

$\alpha_i(t)$ is a conversion factor;

$\underline{c}_i(t)$ is an N×1 vector of coefficients used to compute the predicted channel gain and is initialized to all zeros, or $\underline{c}_i(\Delta+N-1)=\underline{0}$;

λ is a memory factor for the channel, which may be set to value between zero and one (i.e., 0<λ≦1), where a small value may be used for a fast changing channel;

N is the number of estimated channel gains used to derive the predicted channel gain; and "$^T$" denotes a transpose, "*" denotes a conjugate, and "$^H$" denotes a Hermitian or conjugate transpose.

In equation set (2), the first six equations (2a) through (2f) are for the RLS filter that is used to derive the coefficient vector $\underline{c}_i(t)$, and the last equation (2g) is the computation to derive the predicted channel gains $\tilde{h}_i(t+\Delta)$, for i∈ {0, 1}. The RLS filter may be updated whenever new estimated channel gains $\hat{h}_i(t)$ are available, which may be for each pair of pilot symbols received for the two transmit antennas. The channel gain computation in equation (2g) may be performed whenever the predicted channel gains are needed, which may be whenever the predicted weights are needed. In general, the updating of the RLS filter and the predicted channel gain computation may be performed at the same or different rates.

For W-CDMA, the weight computation (and thus the predicted channel gain computation) is typically performed for each slot, in which case t may be an index for slots. In one embodiment, one pair of estimated channel gains $\hat{h}_0(t)$ and $\hat{h}_1(t)$ is derived for each slot by the estimation filters based on all de-patterned pilot symbols received for that slot. In another embodiment, the RLS filter may be updated for each pair of de-patterned pilot symbols. For this embodiment, the indices for the equations in equation set (2) may be revised accordingly. For simplicity, the updating of the RLS filter and the predicted channel gain computation are assumed to be performed at the same rate.

As shown in equation set (2), for the RLS filter, the cross-correlation between N prior estimated channel gains, from $\hat{h}_i(t-\Delta)$ to $\hat{h}_i(t-\Delta-N+1)$, is determined and accumulated in the correlation matrix $\underline{P}_i(t)$. The coefficient vector $\underline{c}_i(t)$ is then updated based on the vector $\underline{\hat{h}}_i(t)$ of prior estimated channel gains, the correlation matrix $\underline{P}_i(t)$, the current estimated channel gain $\hat{h}_i(t)$, and the prior coefficient vector $\underline{c}_i(t-1)$. For the channel gain computation, the predicted channel gain $\tilde{h}_i(r+\Delta)$ is computed based on the current coefficient vector $\underline{c}_i(t)$ and the vector $\underline{\hat{h}}_i(t+\Delta)$ of N most recent estimated channel gains, from $\hat{h}_1(t)$ to $\hat{h}_i(t-N+1)$.

The RLS algorithm is described in further detail by D. G. Manolakis et al. in "Statistical and Adaptive Signal Processing," 1st edition, 2000, McGraw-Hill.

Referring back to FIG. 4A, weight computation unit 424 receives the predicted channel gains $\tilde{h}_0(t+\Delta)$ and $\tilde{h}_1(t+\Delta)$ from prediction filters 422a and 422b, respectively. Unit 424 then computes the weights $\tilde{w}_{cp,0}(t+\Delta)$ and $\tilde{w}{cp,1}(t+\Delta)$, which are predicted to be optimal at the future time instant t+Δ when the weights are applied at the base station. Optimality may be determined based on one or more criteria. In an embodiment, the optimal weights are the weights that would result in the highest received signal-to-noise ratio (SNR) for the received signals at the terminal. The computation for the predicted optimal weights may then be expressed as:

$$\tilde{w}_{cp,0}(t+\Delta) = \sqrt{\frac{|\tilde{h}_0(t+\Delta)|^2}{|\tilde{h}_0(t+\Delta)|^2+|\tilde{h}_1(t+\Delta)|^2}}, \text{ and} \qquad \text{Eq (3a)}$$

$$\tilde{w}_{cp,1}(t+\Delta) = \sqrt{\frac{|\tilde{h}_1(t+\Delta)|^2}{|\tilde{h}_0(t+\Delta)|^2+|\tilde{h}_1(t+\Delta)|^2}} \cdot e^{j\theta(t+\Delta)}, \qquad \text{Eq (3b)}$$

where $|\tilde{h}_0(t+\Delta)|^2$ is the squared magnitude of the predicted channel gain $\tilde{h}_0(t+\Delta)$ for the reference antenna (i.e., $|\tilde{h}_0(t+\Delta)|^2=\tilde{h}_0(t+\Delta)\tilde{h}_0^*(t+\Delta)$);

$|\tilde{h}_1(t+\Delta)|^2$ is the squared magnitude of the predicted channel gain $\tilde{h}_1(t+\Delta)$ for the diversity antenna (i.e., $|\tilde{h}_1(t+\Delta)|^2=\tilde{h}_1(t+\Delta)\tilde{h}_1^*(t+\Delta)$); and θ(t+Δ) is the angle between the two predicted weights, which can be expressed as:

$$\theta(t+\Delta) = \angle\tilde{h}_0(t+\Delta)\tilde{h}_1^*(t+\Delta) \qquad \text{Eq (4)}$$
$$= \tan^{-1}\left(\frac{\text{Im}\{\tilde{h}_0(t+\Delta)\tilde{h}_1^*(t+\Delta)\}}{\text{Re}\{\tilde{h}_0(t+\Delta)\tilde{h}_1^*(t+\Delta)\}}\right).$$

Referring back to FIG. 1, for the downlink, two RF modulated signals are transmitted from two antennas at the base station. Due to artifacts (e.g., buildings, trees, and so on) in the wireless channel, each RF modulated signal may reach the antenna at the terminal via multiple propagation paths. The signal at the terminal antenna may thus include multiple instances (or multipath components) of each transmitted RF modulated signal. Each multipath component corresponds to a specific RF modulated signal that is received via a specific propagation path.

For a CDMA system, a rake receiver is often used to process a number of multipath components of each RF modulated signal of interest. The rake receiver typically includes a number of demodulation elements (often referred to as "fingers"). Each finger may be assigned to process a specific multipath component of a specific RF modulated signal, which may be selected based on received signal strength. The demodulated data from all assigned fingers are then combined to obtain an improved estimate of the transmitted data.

Each assigned finger may be operated as described above to provide a pair of predicted channel gains $\tilde{h}_{0,j}(t+\Delta)$ and $\tilde{h}_{1,j}(t+\Delta)$ for the two antennas for the j-th multipath component assigned to that finger. The predicted weight $\tilde{w}_{cp,0}(t+\Delta)$ and $\tilde{w}cp,1(t+\Delta)$ may then be computed based on the predicted channel gains for all assigned fingers such that, for example, the highest received SNR is achieved at the terminal for all assigned multipath components. The computation for the predicted weights based on the predicted channel gains for M assigned multipath components may then be expressed as:

$$\tilde{w}_{cp,0}(t+\Delta) = \sqrt{\frac{\|\tilde{\underline{h}}_0(t+\Delta)\|}{\|\tilde{\underline{h}}_0(t+\Delta)\| + \|\tilde{\underline{h}}_1(t+\Delta)\|}}, \text{ and} \quad \text{Eq (5a)}$$

$$\tilde{w}_{cp,1}(t+\Delta) = \sqrt{\frac{\|\tilde{\underline{h}}_1(t+\Delta)\|}{\|\tilde{\underline{h}}_0(t+\Delta)\| + \|\tilde{\underline{h}}_1(t+\Delta)\|}} \cdot e^{j\theta(t+\Delta)}, \quad \text{Eq (5b)}$$

where $\tilde{\underline{h}}_0(t+\Delta)$ is an M×1 vector of the predicted channel gains for the M multipath components of the RF modulated signal transmitted from the reference antenna (i.e., $\tilde{\underline{h}}_0(t+\Delta) = [\tilde{h}_{0,1}(t+\Delta)\ \tilde{h}_{0,2}(t+\Delta)\ \ldots\ \tilde{h}_{0,M}(t+\Delta)]^T$);

$\tilde{\underline{h}}_1(t+\Delta)$ is an M×1 vector of the predicted channel gains for the M multipath components of the RF modulated signal transmitted from the diversity antenna (i.e., $\tilde{\underline{h}}_1(t+\Delta) = [\tilde{h}_{1,1}(t+\Delta)\ \tilde{h}_{1,2}(t+\Delta)\ \ldots\ \tilde{h}_{1,M}(t+\Delta)]^T$);

$\|\tilde{\underline{h}}_0(t+\Delta)\|$ is the norm of $\tilde{\underline{h}}_0(t+\Delta)$, or $\|\tilde{\underline{h}}_0(t+\Delta)\| = \tilde{\underline{h}}_0^H(t+\Delta)\tilde{\underline{h}}_0(t+\Delta)$;

$\|\tilde{\underline{h}}_1(t+\Delta)\|$ is the norm of $\tilde{\underline{h}}_1(t+\Delta)$, or $\|\tilde{\underline{h}}_1(t+\Delta)\| = \tilde{\underline{h}}_1^H(t+\Delta)\tilde{\underline{h}}_1(t+\Delta)$; and $\theta(t+\Delta)$ is the angle between the two predicted weights, which can be expressed as:

$$\theta(t+\Delta) = \angle \tilde{\underline{h}}_1^H(t+\Delta)\tilde{\underline{h}}_0(t+\Delta) \quad \text{Eq (6)}$$
$$= \tan^{-1}\left(\frac{\text{Im}\{\tilde{\underline{h}}_1^H(t+\Delta)\tilde{\underline{h}}_0(t+\Delta)\}}{\text{Re}\{\tilde{\underline{h}}_1^H(t+\Delta)\tilde{\underline{h}}_0(t+\Delta)\}}\right).$$

In any case, regardless of the number of assigned multipath components, the two predicted weight $\tilde{w}_{cp,0}(t+\Delta)$ and $\tilde{w}_{cp,1}(t+\Delta)$ may be normalized such that the weight for the reference antenna is set to 1.0 and the weight for the diversity antenna is given as $\tilde{w}_{cp}(t+\Delta) = \tilde{w}_{cp,1}(t+\Delta)/\tilde{w}_{cp,0}(t+\Delta)$. The normalization results in only one predicted weight (instead of two) needing to be sent back to the base station, which then reduces the amount of overhead signaling. The normalized weight $\tilde{w}_{cp}(t+\Delta)$ for the diversity antenna is then compressed and quantized (e.g., as specified by W-CDMA) and sent back to the base station.

For the weight prediction scheme, the optimal weights for the current time instant are first computed based on the estimated channel gains. The current optimal weights are then used to predict the optimal weights at the future time instant.

Figure 5:
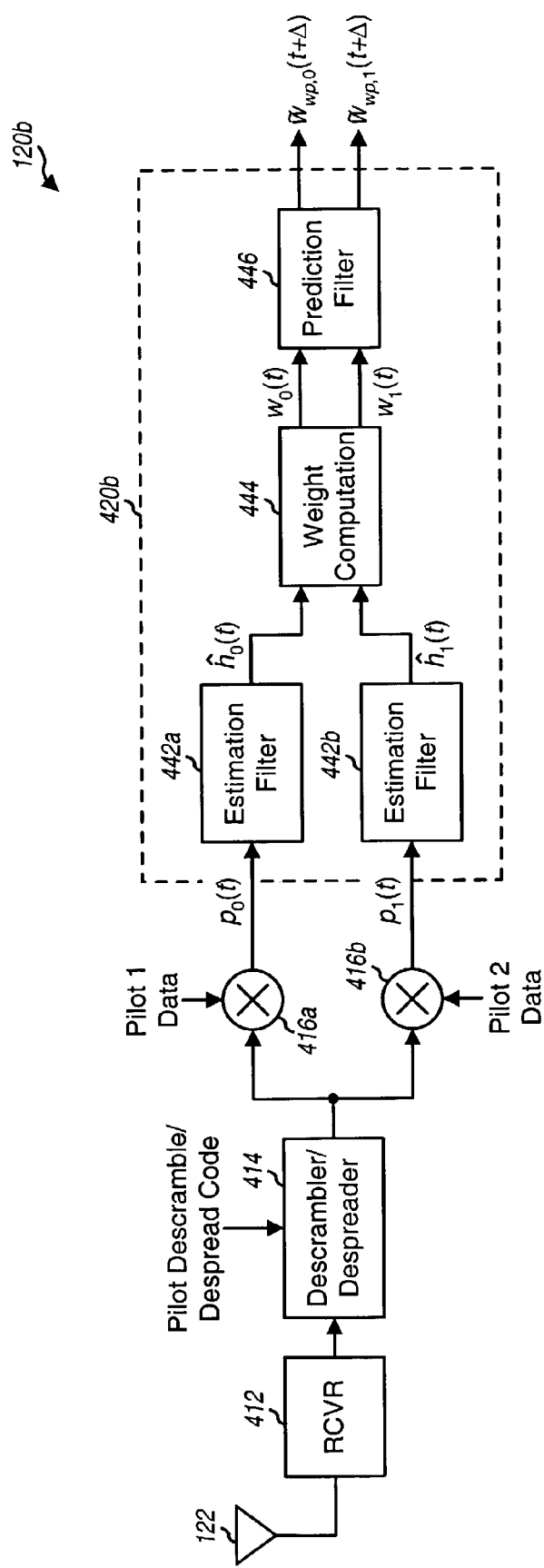
FIG. 5 shows a block diagram of the processing at the terminal for the weight prediction scheme.

FIG. 5 shows a block diagram of the processing at a terminal 120b for the weight prediction scheme. Terminal 120b is another embodiment of terminal 120 in FIG. 1. The two downlink RF modulated signals transmitted by the base station are received by antenna 122 and processed as described above to provide de-patterned pilot symbols $p_0(t)$ and $p_1(t)$. A processing unit 420b then receives and operates on the de-patterned pilot symbols $p_0(t)$ and $p_1(t)$, in accordance with the weight prediction scheme, to provide weights $\tilde{w}_{wp,0}(t+\Delta)$ and $\tilde{w}_{wp,1}(t+\Delta)$, which are predicted to be optimal at the future time instant t+Δ.

In the embodiment shown in FIG. 5, for the weight prediction scheme, processing unit 420b includes estimation filters 442a and 442b, a weight computation unit 444, and a prediction filter 446. Each estimation filter 442 receives and processes the de-patterned pilot symbols $p_i(t)$ for a particular antenna i, where i ∈ {0, 1}, to provide an estimate of the channel gain $\hat{h}_i(t)$ for that antenna. Each estimation filter 442 may be implemented as a lowpass filter, such as an IIR filter or a FIR filter, or some other type of filter that can estimate the channel gain based on noisy de-patterned pilot symbols.

Weight computation unit 444 then receives the estimated channel gains $\hat{h}_0(t)$ and $\hat{h}_1(t)$ from estimation filters 442a and 442b, respectively. Unit 444 then computes the current weights $w_0(t)$ and $w_1(t)$, which are deemed to be optimal for the current time instant t. The computation for the current optimal weights may be expressed as:

$$w_0(t) = \sqrt{\frac{|\hat{h}_0(t)|^2}{|\hat{h}_0(t)|^2 + |\hat{h}_1(t)|^2}}, \text{ and} \quad \text{Eq (7a)}$$

$$w_1(t) = \sqrt{\frac{|\hat{h}_1(t)|^2}{|\hat{h}_0(t)|^2 + |\hat{h}_1(t)|^2}} \cdot e^{j\angle \hat{h}_0(t)\hat{h}_1^*(t)}, \quad \text{Eq (7b)}$$

where $|\hat{h}_0(t)|^2$ is the squared magnitude of the estimated channel gain $\hat{h}_0(t)$ for the reference antenna;

$|\hat{h}_1(t)|^2$ is the squared magnitude of the estimated channel gain $\hat{h}_1(t)$ for the diversity antenna; and $\angle \hat{h}_0(t)\hat{h}_1^*(t)$ is the angle between the two current weights.

Again, for a CDMA system, a number of fingers may be assigned to process a number of multipath components of each of the two RF modulated signals. Each assigned finger may be operated as described above to provide the estimated channel gains $\hat{h}_{0,j}(t)$ and $\hat{h}_{1,j}(t)$ for the two antennas for the j-th multipath component assigned to the finger. The current weights $w_0(t)$ and $w_1(t)$ may then be computed based on the estimated channel gains associated with all assigned multipath components. The computation for the current weights based on the estimated channel gains for M assigned multipath components may be expressed as:

$$w_0(t) = \sqrt{\frac{\|\hat{\underline{h}}_0(t)\|}{\|\hat{\underline{h}}_0(t)\| + \|\hat{\underline{h}}_1(t)\|}}, \text{ and} \quad \text{Eq (8a)}$$

$$w_1(t) = \sqrt{\frac{\|\hat{\underline{h}}_1(t)\|}{\|\hat{\underline{h}}_0(t)\| + \|\hat{\underline{h}}_1(t)\|}} \cdot e^{j\angle \hat{\underline{h}}_1^H(t)\hat{\underline{h}}_0(t)}, \quad \text{Eq (8b)}$$

where $\hat{\underline{h}}_0(t)$ is an M×1 vector of the estimated channel gains for the M multipath components of the RF modulated signal transmitted from the reference antenna (i.e., $\hat{\underline{h}}_0(t) = [\hat{h}_{0,1}(t)\ \hat{h}_{0,2}(t)\ \ldots\ \hat{h}_{0,M}(t)]^T$);

$\hat{\underline{h}}_1(t)$ is an M×1 vector of the estimated channel gains for the M multipath components of the RF modulated signal transmitted from the diversity antenna (i.e., $\hat{h}_1(t)=[\hat{h}_{1,1}(t)\ \hat{h}_{1,2}(t)\ \ldots\ \hat{h}_{1,M}(t)]^T$);

$\|\hat{h}_0(t)\|$ is the norm of $\hat{h}_0(t)$, or $\|\hat{h}_0(t)\|=\hat{h}_0^H(t)\hat{h}_0(t)$;

$\|\hat{h}_1(t)\|$ is the norm of $\hat{h}_1(t)$, or $\|\hat{h}_1(t)\|=\hat{h}_1^H(t)\hat{h}_1(t)$; and $\angle \hat{h}_1^H(t)\hat{h}_0(t)$ is the angle between the two predicted weights.

In any case, prediction filter 446 receives and processes the current optimal weights $w_0(t)$ and $w_1(t)$ to provide the predicted optimal weights $\tilde{w}_{wp,0}(t+\Delta)$ and $\tilde{w}_{wp,1}(t+\Delta)$ for the future time instant $t+\Delta$. Prediction filter 446 may be implemented as an adaptive filter or a non-adaptive filter and with an IIR, FIR, or some other filter structure. For an adaptive filter, the LMS, RLS, or some other adaptive algorithm may be used to adapt the filter. The adaptation criterion for the adaptive filter may be expressed as:

$$\text{Min}\|\underline{w}_0(t)-\underline{\tilde{w}}_0(t)\|\ \text{and}\ \text{Min}\|\underline{w}_1(t)-\underline{\tilde{w}}_1(t)\|, \qquad \text{Eq(9)}$$

where $\underline{w}_0(t)$ and $\underline{w}_1(t)$ are N×1 vectors of current computed weights for the reference and diversity antennas, respectively;

$\underline{\tilde{w}}_0(t)$ and $\underline{\tilde{w}}_1(t)$ are N×1 vectors of prior predicted weights for the reference and diversity antennas, respectively; and $\|\underline{x}\|$ represents the norm of vector $\underline{x}$ (i.e., the sum of the squared magnitude of the individual elements of $\underline{x}$).

The weight vectors may be given as:

$$\underline{w}_0(t)=[w_0(t)w_0(t-1)\ldots w_0(t-N+1)]^T,\ \underline{\tilde{w}}_0(t)=[\tilde{w}_0(t)\ \tilde{w}_0(t-1)\ldots \tilde{w}_0(t-N+1)]^T,$$

$$\underline{w}_1(t)=[w_1(t)w_1(t-1)\ldots w_1(t-N+1)]^T,\ \underline{\tilde{w}}_1(t)=[\tilde{w}_1(t-1)\ldots \tilde{w}_1(t-N+1)]^T.$$

In a specific embodiment, prediction filter 446 is implemented as an adaptive LMS filter. The predicted optimal weights $\tilde{w}_{wp,0}(t+\Delta)$ and $\tilde{w}_{wp,1}(t+\Delta)$ may then be computed as follows:

$$w'_0(t)=\underline{b}_0^H(t-1)_0(t)\ \text{and}\ w'_1(t)=\underline{b}_1^H(T-1)_1(t), \qquad \text{Eq(10a)}$$

$$e_0(t)=w_0(t)-w'_0(t)\ \text{and}\ e_1(t)=w_1(t)-w'_1(t), \qquad \text{Eq(10b)}$$

$$\underline{b}_0(t)=\underline{b}_0(t-1)+2\mu_0(t)\ e_0^*(t)\ \text{and}\ \underline{b}_1(t)=\underline{b}_1(t-1)+2\mu_1(t)e_1^*(t), \qquad \text{Eq(10c)}$$

$$\tilde{w}_0(t+\Delta)=\underline{b}_0^H(t)_0(t+\Delta)\ \text{and}\ \tilde{w}_1(t+\Delta)=\underline{b}_1^H(t)_1(t+\Delta), \qquad \text{Eq(10d)}$$

where $_i(t)$, for $i\in\{0, 1\}$, is an N×1 vector of prior computed weights (i.e., $$_i(t)=[w_i(t-\Delta)\ w_i(t-\Delta-1)\ldots w_i(t-\Delta-N+1)]^T);$$

$\underline{b}_i(t)$ is an n×1 vector of coefficients used to compute the predicted weights and is initialized to all zeros, or $\underline{b}_i(\Delta+N-1)=0$;

$e_i(t)$ is an error in the predicted weight $w'_i(t)$; and $\mu$ is a step size, which is selected to be small enough to ensure convergence.

In equation set (10), the first three equations (10a) through (10c) are for the LMS filter that is used to derive the coefficient vector $\underline{b}_i(t)$, and the last equation (10d) is the computation to derive the predicted weight $\tilde{w}_{wp,i}(t+\Delta)$ for the future time instant $t+\Delta$. The LMS filter may be updated whenever new computed weights $w_0(t)$ and $w_1(t)$ are available, and the weight computation may be performed whenever the predicted weights are needed. In general, the updating of the LMS filter and the weight computation may be performed at the same or different rates.

For the LMS filter, the N prior computed weights, from $w_i(t-\Delta)$ to $w_i(t-\Delta-N+1)$, and the prior coefficient vector $\underline{b}_i(t-1)$ are used to derive $w'_i(t)$, which represents the predicted weight to be applied at the current time instant and derived based on prior information. The error $e_i(t)$ between the computed weight $w_i(t)$ and the predicted weight $w'_i(t)$ is determined. The error $e_i(t)$ and the prior computed weights $_i(t)$ are then used to update the coefficient vector $\underline{b}_i(t)$. For the weight computation, the predicted weight $\tilde{w}_i(t+\Delta)$ for the future time instant $t+\Delta$ is computed based on the current coefficient vector $\underline{b}_i(t)$ and the vector $_i(t+\Delta)$ of the N most recent computed weights, from $w_i(t)$ to $w_i(t-N+1)$.

The LMS algorithm is also described in detail in the aforementioned "Statistical and Adaptive Signal Processing" reference.

Figure 6:
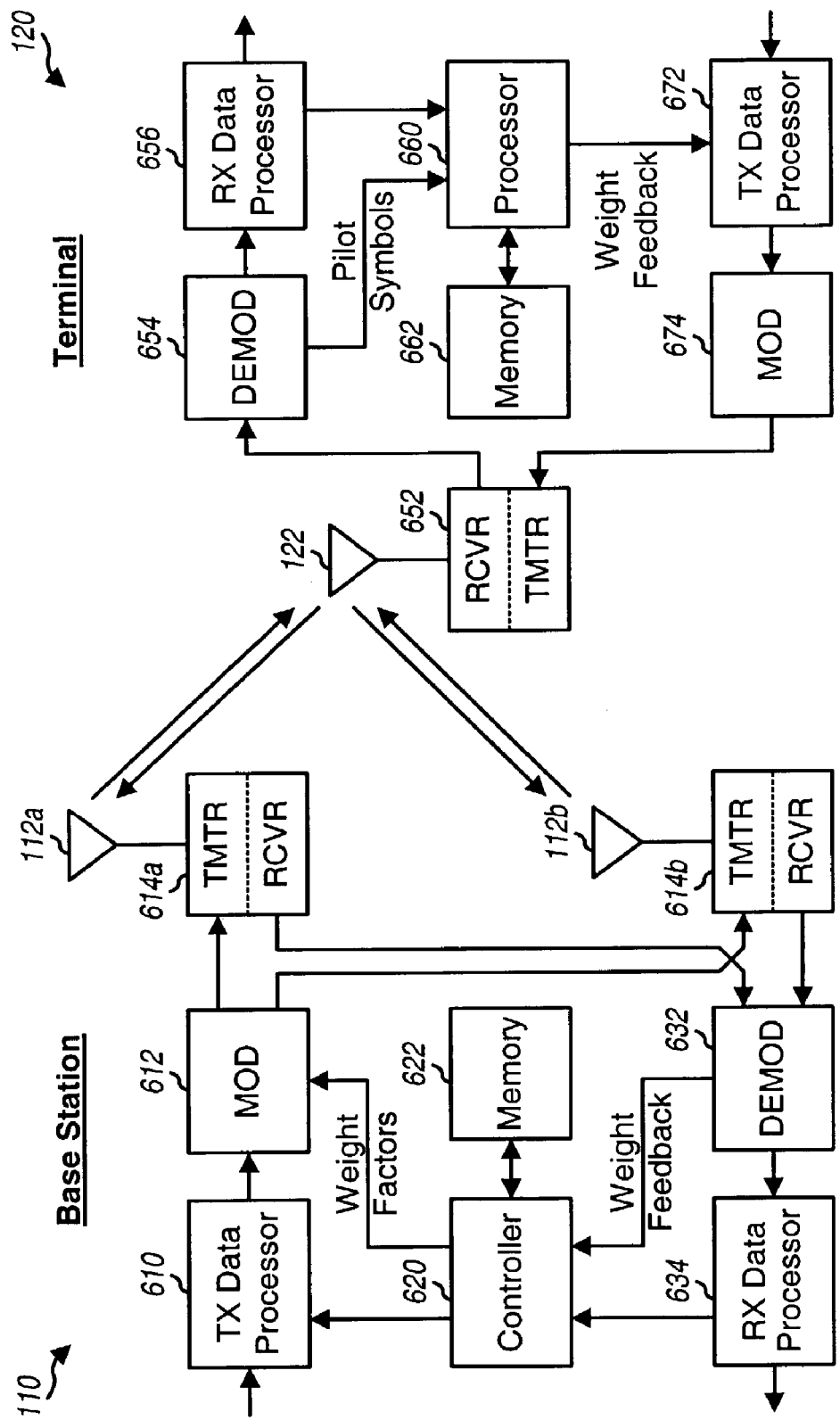
FIG. 6 shows a block diagram of the base station and the terminal.

FIG. 6 is a block diagram of an embodiment of base station 110 and terminal 120. On the downlink, a transmit (TX) data processor 610 receives data of various types and processes (e.g., formats, encodes, and interleaves) the received data. The processed data is further processed (e.g., channelized with one or more OVCF codes, spectrally spread with a scrambling code, and so on) by a modulator (MOD) 612. The modulated data is then multiplied with a set of weight factors $W_1$ and $W_2$ and combined with pilot symbols, as described above for FIG. 2. Modulator 612 provides two complex-valued data streams to transmitter units (TMTRs) 614a and 614b. Each data stream is conditioned (e.g., converted to one or more analog signals, amplified, filtered, frequency upconverted, and so on) by a respective transmitter unit 614 to generate a downlink RF modulated signal. Two downlink RF modulated signals from transmitter units 614a and 614b are then transmitted from antennas 112a and 112b, respectively.

At terminal 120, the downlink RF modulated signals are received by antenna 122 and provided to a receiver unit (RCVR) 652. Receiver unit 652 conditions (e.g., filters, amplifies, and frequency downconverts) the signal from antenna 122 and further digitizes the conditioned signal to provide samples. A demodulator (DEMOD) 654 further processes (e.g., descrambles and despreads) the samples to provide de-patterned pilot symbols and data symbols. The data symbols are further processed (e.g., deinterleaved and decoded) by an RX data processor 656 to provided decoded data, and the de-patterned pilot symbols $p_0(t)$ and $p_1(t)$ are provided to a processor 660.

Processor 660 uses the de-patterned pilot symbols to derive predicted weights, $\tilde{w}_0(t+\Delta)$ and $\tilde{w}_1(t+\Delta)$, for the future time instant $t+\Delta$. Processor 660 may implement the channel prediction scheme and/or the weight prediction scheme described above. The predicted weights are further processed (e.g., normalized), compressed, and quantized to provide weight feedback, which is then sent to a TX data processor 672.

On the uplink, TX data processor 672 receives and processes various types of data, including the weight feedback. The data from TX data processor 672 is further processed (e.g., spread and scrambled) by a modulator 674 and then conditioned by a transmitter unit 652 to generate an uplink RF modulated signal, which is then transmitted from antenna 652.

At base station 110, the uplink RF modulated signal is received by antennas 112a and 112b, and conditioned and digitized by receiver units 614a and 614b to provide samples. A demodulator 632 further processes the samples to recover the weight feedback, which is provided to a controller 620. Controller 620 then derives the weight factors $W_1$ and $W_2$ based on the weight feedback. These weight factors are provided to modulator 612 and used to adjust the phase and possibly the amplitude of the two downlink RF modulated signals.

Controller 620 and processor 660 direct the operation of various processing units within the base station and terminal, respectively. Processor 660 may be designed to derive the predicted weights for the closed loop transmit diversity and may implement processing unit 420a in FIG. 4A and/or processing unit 420b in FIG. 5. Alternatively, the computation to derive the predicted weights may be performed by controller 620 based on pertinent feedback information from the terminal. In this case, controller 620 may implement processing unit 420a in FIG. 4A and/or processing unit 420b in FIG. 5. Memory units 622 and 662 may store data and program codes used by various processing units within the base station and terminal, respectively.

For clarity, various aspects and embodiments of the techniques for predicting weights used for closed-loop transmit diversity have been specifically described for a W-CDMA system. In general, these techniques may be used for various wireless communication systems that employ transmit diversity. For example, these techniques may also be used for a cdma2000 system, multiple-input single-output (MISO) systems, multiple-input multiple-output (MIMO) systems, and so on.

Moreover, the weight prediction techniques described herein may be used for various closed-loop transmit diversity schemes that employ at least two transmit antennas for data transmission. The closed loop mode transmit diversity scheme defined by W-CDMA is an example scheme where these techniques may be used. In general, these techniques may be used for any closed-loop transmit diversity scheme that exhibits some delay between the time the weights are computed to the time they are applied. Moreover, these techniques may be used with any number of transmit antennas.

The techniques described herein for predicting weights used for closed-loop transmit diversity may be implemented by various means. For example, these techniques may be implemented in hardware, software, or a combination thereof. For a hardware implementation, the elements used to perform the weight prediction may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the weight prediction may be implemented with modules (e.g., procedures, functions, and so on) that perform the functions described herein. The software codes may be stored in a memory unit (e.g., memory unit 622 or 662 in FIG. 6) and executed by a processor (e.g., controller 620 or processor 660). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device operative to derive weights used for transmit diversity in a wireless communication system, comprising:
   at least one estimation filter operative to estimate channel gains for a plurality of transmit antennas of a transmitter for a current time instance;
   a weight computation unit operative to derive at least one weight for the plurality of transmit antennas based on the estimated channel gains for the current time instance; and
   a processor operative to send the at least one weight to the transmitter to apply at a future time instant on the plurality of transmit antennas for data transmission to the device,
   wherein the at least one weight is predicted to be optimal, based on at least one criterion, at the future time instant when the at least one weight is applied at the transmitter, and wherein the prediction accounts for feedback delay in sending the at least one weight from the device to the transmitter.

2. The device of claim 1, wherein the at least one weight is applied on at least one of a plurality of signals transmitted from the plurality of transmit antennas.

3. The device of claim 2, wherein the at least one criterion relates to maximizing a received signal-to-noise ratio (SNR) for the plurality of signals.

4. The device of claim 1, wherein the at least one weight is derived with use of a recursive least square (RLS) filter.

5. The device of claim 1, wherein the at least one weight is derived with use of a least mean square (LMS) filter.

6. The device of claim 1, further comprising:
   at least one prediction filter operative to derive predicted channel gains for the plurality of transmit antennas based on the estimated channel gains for the current time instance, wherein the predicted channel gains are channel gains predicted for the future time instance, and wherein the at least one weight is derived based on the predicted channel gains.

7. The device of claim 1, wherein the weight computation unit is operative to derive current weights for the plurality of transmit antennas based on the estimated channel gains for the current time instance and to derive the at least one weight for the future time instant based on the current weights.

8. The device of claim 7, wherein the current weights are determined to be optimal at the current time instant.

9. The device of claim 1, wherein the channel gains are estimated for a plurality of propagation paths for each of the plurality of transmit antennas.

10. The device of claim 1, wherein the at least one estimation filter is operative to filter pilot symbols received from the plurality of transmit antennas to obtain the estimated channel gains for the plurality of transmit antennas.

11. The device of claim 1, wherein the at least one estimation filter is implemented as a lowpass filter.

12. The device of claim 1, wherein the weight computation unit is operative to derive two predicted weights for two transmit antennas and to normalize the two predicted weights to obtain a normalized predicted weight for one of the two transmit antennas.

13. The device of claim 1, wherein the wireless communication system is a CDMA system.

14. The device of claim 1, wherein the wireless communication system is a W-CDMA system.

15. The device of claim 1, wherein the at least one weight is predicted to be optimal at the future time instant for a plurality of propagation paths for the plurality of transmit antennas.

16. The device of claim 1, wherein the at least one weight is sent to a base station and applied to the plurality of transmit antennas for data transmission on downlink to the device.

17. A device operative to derive weights used for transmit diversity in a CDMA communication system, comprising:
at least one estimation filter operative to estimate channel gains for a plurality of transmit antennas of a transmitter for a current time instance;
at least one prediction filter operative to derive predicted channel gains for the plurality of transmit antennas for a future time instance based on the estimated channel gains for the current time instance;
a weight computation unit operative to derive at least one weight for the plurality of transmit antennas based on the predicted channel gains; and
a processor operative to send the at least one weight to the transmitter to apply at the future time instant on the plurality of transmit antennas for data transmission to the device,
wherein the at least one weight is predicted to be optimal, based on at least one criterion, at the future time instant when the at least one weight is applied at the transmitter, and wherein the prediction accounts for feedback delay in sending the at least one weight from the device to the transmitter.

18. The device of claim 17, wherein the at least one criterion relates to maximizing a received signal-to-noise ratio (SNR) for a plurality of signals transmitted from the plurality of transmit antennas.

19. A device operative to derive weights used for transmit diversity in a CDMA communication system, comprising:
at least one estimation filter operative to estimate channel gains for a plurality of transmit antennas of a transmitter for a current time instance;
a weight computation unit operative to determine current weights for the plurality of transmit antennas based on the estimated channel gains, wherein the current weights are determined to be optimal, based on at least one criterion, at the current time instant;
a prediction filter operative to derive at least one predicted weight for the plurality of transmit antennas based on the current weights; and
a processor operative to send the at least one predicted weight to the transmitter to apply at a fixture time instant on the plurality of transmit antennas for data transmission to the device,
wherein the at least one predicted weight is deemed to be optimal, based on the at least one criterion, at the future time instant when the at least one predicted weight is applied at the transmitter, and wherein the prediction accounts for feedback delay in sending the at least one predicted weight from the device to the transmitter.

20. The device of claim 19, wherein the at least one criterion relates to maximizing a received signal-to-noise ratio (SNR) for a plurality of signals transmitted from the plurality of transmit antennas.

21. An integrated circuit for a receiver and comprising a processor operative to estimate channel gains for a plurality of transmit antennas of a transmitter for a current time instance, to derive at least one weight for the plurality of transmit antennas based on the estimated channel gains for the current time instance, and to send the at least one weight to the transmitter to apply at a future time instant on the plurality of transmit antennas for data transmission to the receiver, wherein the at least one weight is predicted to be optimal, based on at least one criterion, at the future time instant when the at least one weight is applied at the transmitter, and wherein the prediction accounts for feedback delay in sending the at least one weight from the receiver to the transmitter.

22. The integrated circuit of claim 21, wherein the processor is further operative to derive predicted channel gains for the plurality of transmit antennas based on the estimated channel gains for the current time instance, wherein the predicted channel gains are channel gains predicted for the future time instance, and wherein the at least one weight is derived based on the predicted channel gains.

23. The integrated circuit of claim 21, wherein the processor is further operative to derive current weights for the plurality of transmit antennas based on the estimated channel gains for the current time instance, and wherein the at least one weight predicted to be optimal for the plurality of transmit antennas at the future time instant is derived based on the current weights.

24. The integrated circuit of claim 21, wherein the processor is further operative to derive the at least one weight with a recursive least square (RLS) filter.

25. The integrated circuit of claim 21, wherein the processor is further operative to derive the at least one weight with a least mean square (LMS) filter.

26. An apparatus in a wireless communication system, comprising:
means for estimating channel gains for a plurality of transmit antennas of a transmitter for a current time instance;
means for deriving at least one weight for the plurality of transmit antennas based on the estimated channel gains for the current time instance; and
means for sending the at least one weight to the transmitter to apply at a future time instant on the plurality of transmit antennas for data transmission to the apparatus,
wherein the at least one weight is predicted to be optimal, based on at least one criterion, at the future time instant when the at least one weight is applied at the transmitter, and wherein the prediction accounts for feedback delay in sending the at least one weight from the apparatus to the transmitter.

27. A method of deriving weights at a receiver and used for transmit diversity in a wireless communication system, comprising:
estimating channel gains for a plurality of transmit antennas of a transmitter for a current time instance;
deriving at least one weight for the plurality of transmit antennas based on the estimated channel gains far the current time instance; and
sending the at least one weight to the transmitter to apply at a future time instant on the plurality of transmit antennas for data transmission to the receiver,
wherein the at least one weight is predicted to be optimal, based on at least one criterion, at the future time instant when the at least one weight is applied at the transmitter, and wherein the prediction accounts for feedback delay in sending the at least one weight from the receiver to the transmitter.

28. The method of claim 27, further comprising:
deriving predicted channel gains for the plurality of transmit antennas based on the estimated channel gains for the current time instance, wherein the predicted channel gains are channel gains predicted for the future time instance, and wherein the at least one weight is derived based on the predicted channel gains.

29. The method of claim 27, further comprising:
deriving current weights for the plurality of transmit antennas based on the estimated channel gains for the current time instance, and wherein the at least one weight predicted to be optimal for the plurality of transmit antennas at the future time instant is derived based on the current weights.

30. The method of claim 27, wherein two predicted weights are derived for two transmit antennas, the method further comprising:
normalizing the two predicted weights to obtain a normalized predicted weight for one of the two transmit antennas.

* * * * *